Figure 1:
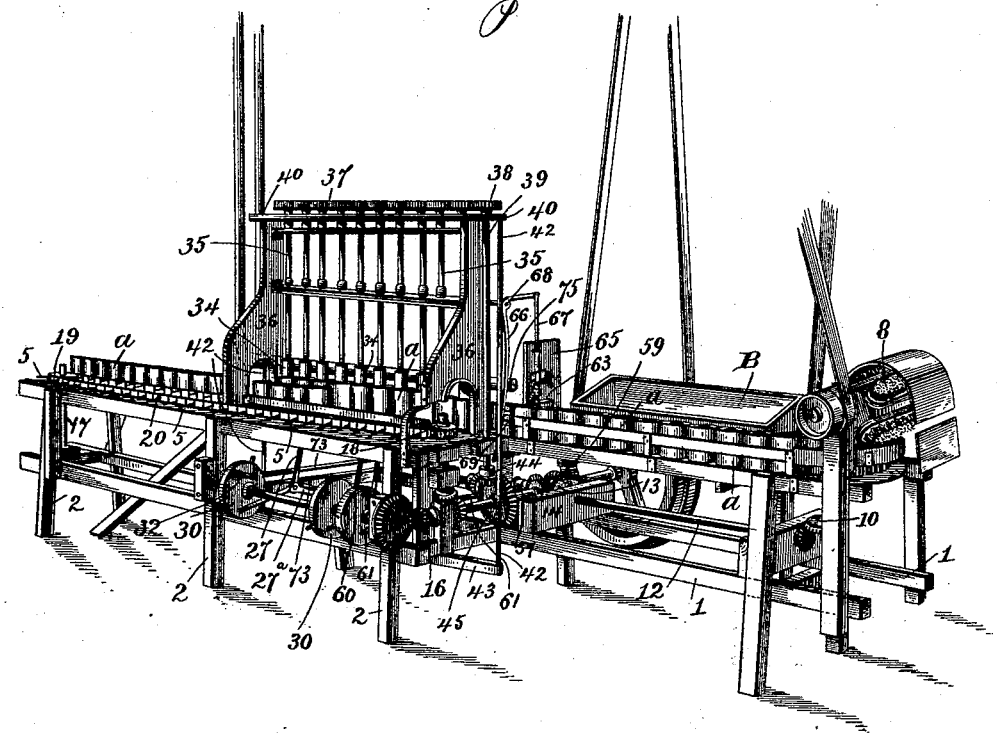

(No Model.)   5 Sheets—Sheet 1.

M. J. HAWKINS.
MACHINE FOR SOLDERING CAPS ON CANS.

No. 520,523.   Patented May 29, 1894.

Witnesses:
Jas. E. Hutchinson.
M. A. Keller.

Inventor.
Millard J. Hawkins
By Risley & Robinson
Attys.

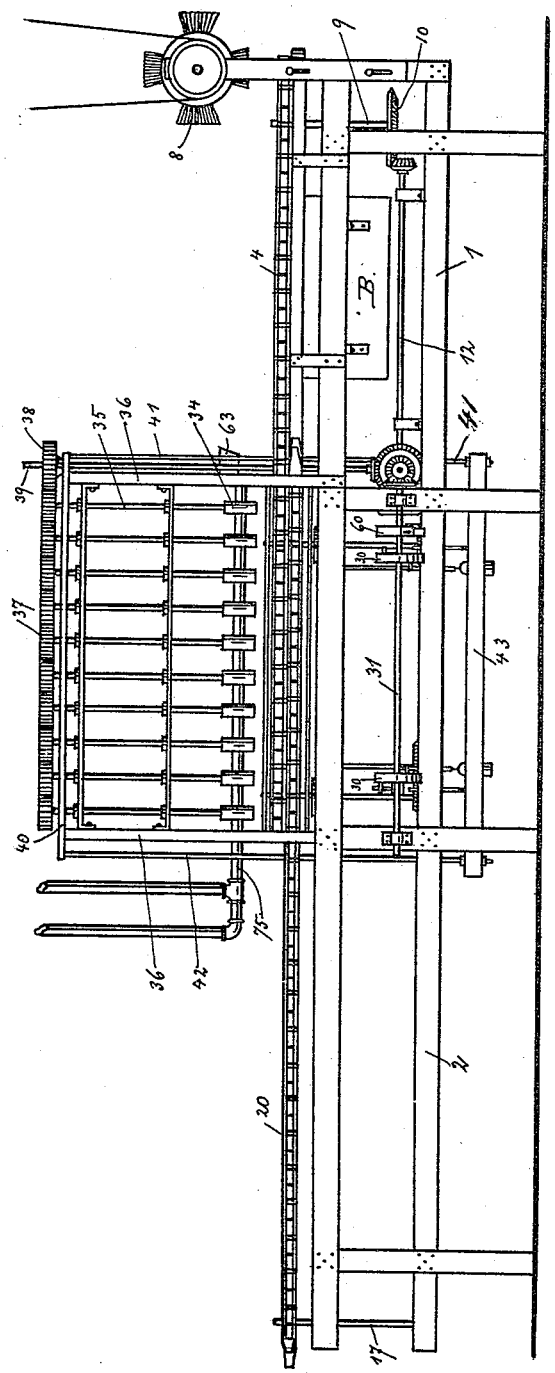

(No Model.) 5 Sheets—Sheet 3.
M. J. HAWKINS.
MACHINE FOR SOLDERING CAPS ON CANS.
No. 520,523. Patented May 29, 1894.
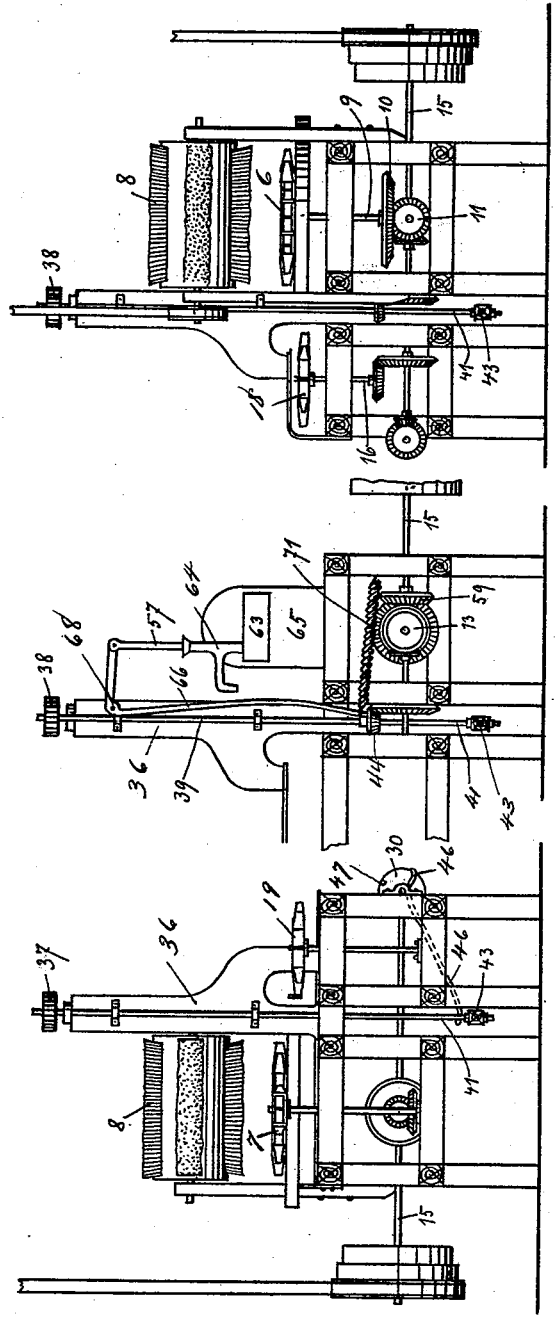
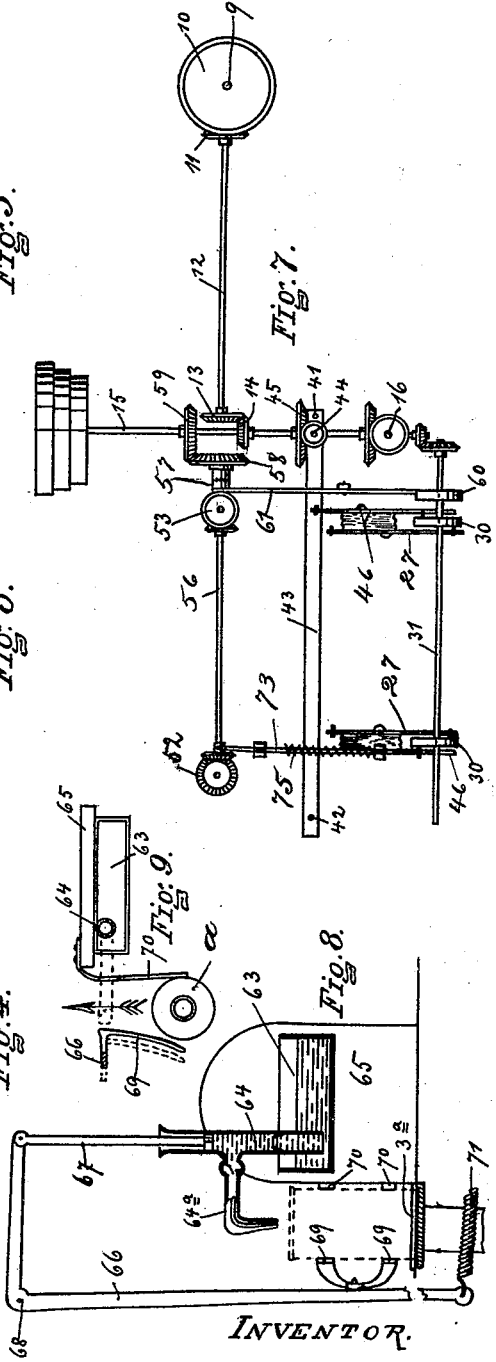
WITNESSES.
Rich. A. George
E. G. Munson
INVENTOR.
M. J. Hawkins.
By Risley & Robinson
ATTORNEYS.

(No Model.) 5 Sheets—Sheet 4.
M. J. HAWKINS.
MACHINE FOR SOLDERING CAPS ON CANS.
No. 520,523. Patented May 29, 1894.
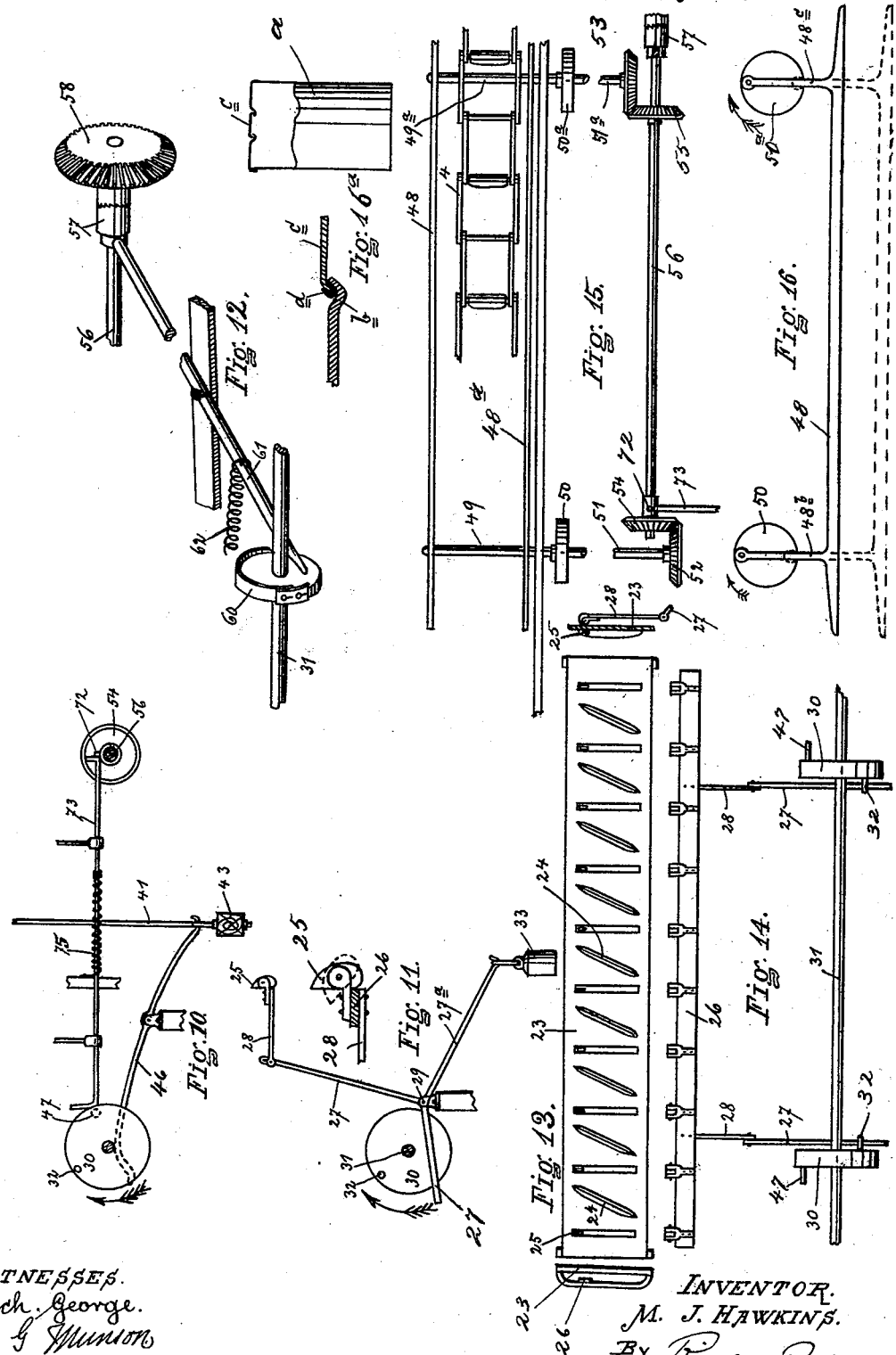
Witnesses.
Rich. George.
E. G. Munson
Inventor.
M. J. Hawkins.
By Risley Robinson
Attorneys.

(No Model.) 5 Sheets—Sheet 5.
M. J. HAWKINS.
MACHINE FOR SOLDERING CAPS ON CANS.
No. 520,523. Patented May 29, 1894.
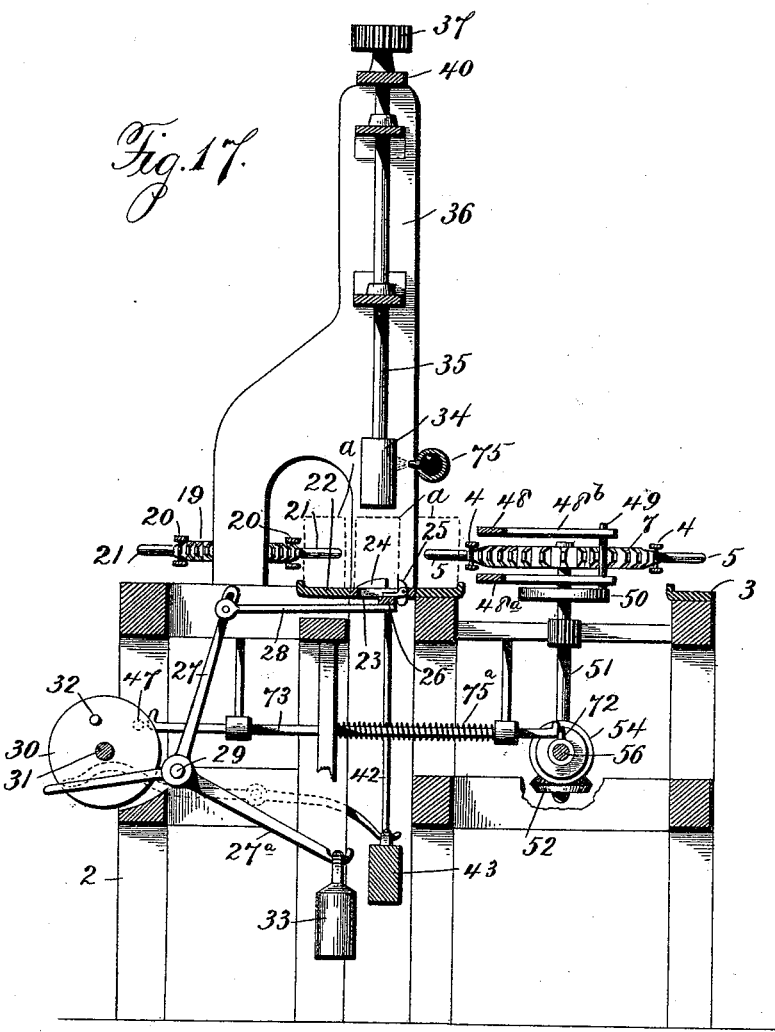
Witnesses:
Jas. E. Hutchinson.
M. A. Keller.
Inventor.
Millard J. Hawkins
By Risley & Robinson
Attys.

UNITED STATES PATENT OFFICE.

MILLARD J. HAWKINS, OF NEWPORT, NEW YORK.

MACHINE FOR SOLDERING CAPS ON CANS.

SPECIFICATION forming part of Letters Patent No. 520,523, dated May 29, 1894.

Application filed July 28, 1893. Serial No. 481,691. (No model.)

*To all whom it may concern:*

Be it known that I, MILLARD J. HAWKINS, of of Newport, in the county of Herkimer and State of New York, have invented certain new and useful Improvements in Machines for Soldering Caps on Cans; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to improvements in machines for soldering caps on cans containing canned goods.

Figure 1 of the drawings is a general perspective of the machine. Fig. 2 of the drawings shows a side elevation of the machine;
Fig. 3 a plan view; a few details being omitted; Fig. 4 an end view as seen from the left of Fig. 2. Fig. 5 is the other end. Fig. 6 is a partial end view and partial section, the parts shown appearing as seen to the left of line A—B Fig.
3. Fig. 7 shows a plan view of working parts in their relative positions. Fig. 8 shows details of a pump for supplying acid to the cans to be soldered. Fig. 9 shows more details relating to the pump. Fig. 10 shows details of mechanism for operating the soldering irons and safety mechanism for returning the can shifting devices to their normal positions. Fig. 11 shows details of mechanism for removing the cans from under the soldering irons.
Fig. 12 shows a clutch and operating mechanism. Fig. 13 shows the table on which the cans are supported while being soldered. Fig. 14 shows mechanism for removing the cans from the soldering table. Fig. 15 shows a side view of the can shipping device in connection with a section of carrier chain and mechanism for operating the shipper. Fig. 16 shows a plan view of the shipper. Fig. 16ª shows a section of the can and cap to be operated upon by the machine, and an enlarged detail of a portion of the cap and can-head showing particularly the band of solder on the edge of the cap. Fig. 17 is a section on an enlarged scale on line C—D of Fig. 3.
1 indicates the main frame and 2 a supplemental side frame secured to the main frame. Above the main frame is provided a narrow plain faced carrier table 3ª extending along both sides of the frame and around one end, over which moves a sprocket chain carrier 4 having fingers 5 placed at suitable intervals to receive a can between them, and projecting from the chain over the table. The sprocket chain 4 is carried by sprocket wheels 6 and 7 at either end of the frame, wheel 6 being the driving sprocket. Over the semi-circular end of the table extending across between the two side tables is provided a rotary brush 8 adapted to brush the heads of the cans as they are moved under it by the sprocket chain 4. The sprocket wheel 6 is driven by a vertical shaft 9 having suitable bearings in the frame and provided with a bevel gear 10 at its lower end. The bevel gear 10 is driven by a bevel gear 11 provided on the horizontal shaft 12 having suitable bearings in the frame. The shaft 12 is also provided with a bevel gear 13 which engages with the bevel gear 14 on the main driving shaft 15. On the frame 2 which laps by and is secured to the main frame, are provided two upright shafts 16 and 17 having bearings in the frame and which carry the sprockets 18 and 19 at their upper ends on which is carried the chain carrier 20 provided with fingers 21 at suitable intervals. The fingers of the carrier project over and are adapted to move cans along the narrow table 22. Between the overlapping ends of table 3ª and table 22 is introduced a soldering table 23 (Fig. 12) having diagonal divisional walls 24 and transverse slots through which the transferring hooks or catches 25 operate. The several catches or transfer hooks are pivoted in ears on a bar 26 and are counterweighted to stand upright as will be clearly understood from Fig. 10. The bar 26 is operated by a pair of forked levers 27 attached to the bar by means of connecting rods 28; suitable guides or slides being provided to support and permit the movement of the bar 26. The forked lever 27 is pivoted at 29 to the frame and is operated by a tripping pin 32 provided in disk 30. Disk 30 is mounted on shaft 31. On the arm 27ª of the forked lever 27 is provided a weight 33 for returning the bar 26 and catches mounted thereon to their normal positions. The table 23 is provided with divisions for receiving ten cans and over these divisions are provided ten rotary soldering irons 34, each mounted on a vertically movable shaft 35 mounted in bearings in an upright extension 36 of the frame. The shafts of the several soldering irons are provided with gears 37 intermeshing with and driven by a gear 38 splined on the upper end of the vertical shaft 39, so as to move up and down the shaft with the soldering irons. The several soldering irons are moved up and down by means of a frame work consisting of a bar 40 in which the several soldering iron shafts have bearing, vertical rods 41 and 42, and a lower cross bar 43. The shaft 39 is provided with a gear 44 meshing with gear 45 on the driving shaft 15. The frame which handles the soldering irons is operated by a pair of levers 46 pivotally supported by the frame, connected with the bar 43 and actuated by a pin 47 in disk 30. For shipping the cans from table 3ª onto the soldering table, there is provided a can shipper having a bar 48 adapted to pass above, and a bar 48ª adapted to pass below the carrier 4 (Figs. 14 and 17). The shipper bars 48 and 48ª are mounted by means of suitable arms 48ᵇ, 48ᶜ on crank pins 49, 49ª secured in disks 50, 50ª. Disks 50, 50ª are mounted on vertical shafts 51, 51ª which are provided with bevel gears 52, and 53, meshed by gears 54 and 55, by means of which the disks are driven from shaft 56, and 51ª. The shaft 56 is driven by means of clutch 57 and gear 58 from the bevel gear 59 on the driving shaft. For operating the clutch 57 there is provided a cam 60 Fig. 12 mounted upon the shaft 31 and operating the clutch by means of an arm 61 The clutch arm 61 is operated by a spring 62 to disengage the clutch. To assure the shipping bars being returned to their normal position after each movement, there is provided a projection 72 on the hub of bevel gear wheel 54 which is adapted to be engaged by the end of the laterally movable thrust rod 73 mounted in suitable bearings on the frame. The opposite end of rod 73 is adapted to be engaged by pin 47 in disk 30 with each revolution driving it to the right as shown in Fig. 9. Then if the shipping bars are not in their proper positions the thrust of rod 73 against the pin 72 will move them into it. The rod 73 is moved in opposite directions by a spring 75.

For supplying acid to the cans to be soldered, I provide an acid tank 63 and pump 64 mounted on a board 65 on the frame. The spout 64ª of the pump projects over the table 3ª (see also position indicated by dotted lines in Fig. 8). To operate the pump for each can, I provide a bell crank lever 66 connected with the plunger 67 pivoted at 68 to the frame and provided with a cam face or projection 69 against which the cans successively operate as they are moved along by the carrier. Opposed to the cam face 69 on the pump lever is a holder 70 secured to the board or bracket 65. Thus as a can is moved along by the carrier it wedges through between the holder 70 and the cam 69 operating the pump in one direction and the spring 71 operates it in the other. The acid is discharged on top of the can as it passes in between cam fingers 69 and holder 70. The soldering-irons are each heated by a jet of gas from pipe 75. In Fig. 16ª is shown a can $a$ in partial cross section, such as is adapted to be operated upon by this machine. In the head of the can is a groove $b$ surrounding the opening, adapted to receive the inwardly turned edge of cover $c$. The edge of the cover is provided with a rim of solder $d$.

The operation of the machine is as follows: The filled cans are fed onto the table 3, preferably at A, and are then moved by the carrier around under the brush 8 which thoroughly cleans the top from all sides as the cams roll around the semi-circular end of the carrier table. As the cans come from under the brush, an attendant places the covers on the cans; the covers being contained in a box B. When ten cans have come opposite the soldering irons, the cam 60 comes into operation, throws the clutch 57 into operation and the shipping bars move ten cans onto the soldering table 23. At this time the pin 47 becomes relieved from the levers 46 which allow the soldering irons to descend upon the cans. The soldering irons remain and rotate upon the tops of the cans until the pin 47 travels around the shaft and again engages and elevates the irons. After the irons are elevated, the pin 32 in the disk 30 engages the lever 27 and the several hooks 25 are operated to move the cans over into carrier 20 where they are allowed to cool as they move along the table 22.

The construction herein shown may be modified and varied in several particulars without departing from the equivalents of my invention.

What I claim as new, and desire to secure by Letters Patent, is—

1. In a soldering machine, two belt carriers lapping by each other, and a stationary soldering table introduced between the overlapping ends, combined substantially as set forth.

2. The combination in a soldering machine for soldering cans, of two belt carriers having ends lapping by a stationary soldering table between the carriers, and a shipping device for transferring cans from one of the carriers on to the soldering table, substantially as set forth.

3. The combination in a soldering machine for soldering cans, of two overlapping belt carriers adapted to move the cans, a soldering table between the carriers, mechanism for moving the cans out of one carrier on to the table, and mechanism for moving the cans from the soldering table into the other carrier, substantially as set forth.

4. The combination in a soldering machine for soldering cans, of a carrier, a table along which the carrier moves the cans, a soldering table located adjacent to the carrier table, a can shipping device adapted to engage and ship several cans simultaneously out of the carrier onto the soldering table, and a series of vertically movable soldering irons over the soldering table, substantially as set forth.

5. In a soldering machine, a soldering table, a feeding carrier operating along one side of the table, a discharging carrier operating along the other side of the table, a shipping-bar adapted to move several cans out of the feeding carrier onto the soldering table, a series of hooks operating through slots in the soldering table to transfer the cans from the soldering table into the discharging carrier, a set of rotary soldering-irons over the soldering table and means for heating and operating them, substantially as set forth.

6. The combination in a soldering machine for soldering cans, of a soldering table, a feeding carrier operating along one side of the table, a discharge carrier operating along the other side of the table, shipping devices for transferring a series of cans out of the feeding carrier onto the soldering table, and off the soldering table into the discharge carrier, an acid supplying pump discharging over the feeding carrier in advance of the soldering table, can engaging finger for operating the pump, a series of soldering irons vertically movable over the soldering table, and means for heating and operating the soldering irons, substantially as set forth.

7. In a can soldering machine a carrier table, a carrier operating to move cans along the table, a soldering table adapted to hold a single row of cans located adjacent to the carrier table, a set of soldering irons, a shipping mechanism for transferring a plurality of cans from the carrier table to the soldering table, combined substantially as set forth.

8. In a can soldering machine, a plain flat faced carrier table, a carrier operating to slide cans along the table, a stationary soldering table located at the side of the carrier table in the same plane, a set of soldering irons, and a can shipping device for transferring a plurality of cans from the carrier table to the soldering table, combined substantially as set forth.

9. In a soldering machine, the combination of two parallel carrier tables, a carrier for each table, a soldering table adapted to receive a single row of cans located between the carrier tables, a set of soldering irons, and mechanism operating to move the cans onto and off from the soldering table, substantially as set forth.

10. The combination in a can soldering machine of a stationary soldering table having can-holding divisions, of a continuously moving carrier moving alongside of the table, and a can shipper adapted to move a plurality of cans out of the carrier on to the soldering table, soldering irons and mechanism for operating the same, substantially as set forth.

11. The combination of a carrier table, a carrier having fingers projecting laterally over the table, a soldering table by the side of and in the plane of the carrier table a can shipper constructed to ship a plurality of cans out from the carrier fingers onto the soldering table, and mechanism for operating the can shipper, substantially as set forth.

12. The combination in a soldering machine, of a soldering table adapted to hold a single row of cans, carrier tables at each side of the soldering table, a carrier for each carrier table, one feeding and the other discharging, means for shipping a can from the feeding carrier onto the soldering table and means operating through the soldering table to transfer the cans from the soldering table into the discharging carrier.

13. The combination in a soldering machine of a soldering table, a carrier table and carrier at side of soldering table, automatic catch adapted to engage the bottom of the can through transverse slots in the soldering table, and mechanism for operating the catches to transfer the cans, substantially as set forth.

In witness whereof I have affixed my signature in presence of two witnesses.

MILLARD J. HAWKINS.

Witnesses:
W. E. SEAVEY,
M. A. KELLER.